United States Patent [19]
Wei

[11] Patent Number: 5,336,344
[45] Date of Patent: Aug. 9, 1994

[54] METHOD FOR PRODUCING A CAST ALUMINUM VEHICLE WHEEL

[75] Inventor: Daniel Wei, Ann Arbor, Mich.

[73] Assignee: Hayes Wheels International, Inc., Romulus, Mich.

[21] Appl. No.: 83,195

[22] Filed: Jun. 24, 1993

Related U.S. Application Data

[63] Continuation of Ser. No. 842,942, Feb. 27, 1992, abandoned.

[51] Int. Cl.$^5$ .............................................. C22F 1/04
[52] U.S. Cl. .................... 148/549; 148/698; 148/702; 266/80; 266/87; 266/99; 266/249; 266/259; 374/153
[58] Field of Search ............... 148/549, 698, 702; 266/80, 87, 99, 249, 259; 374/153

[56] References Cited

U.S. PATENT DOCUMENTS

| | | | |
|---|---|---|---|
| 2,263,823 | 11/1941 | Bonsack et al. | 148/549 |
| 2,381,714 | 8/1945 | Beck | 148/549 |
| 4,229,236 | 10/1980 | Heath | 374/153 |
| 4,419,143 | 12/1983 | Ito et al. | 148/549 |
| 4,420,345 | 12/1983 | Ito et al. | 148/549 |

FOREIGN PATENT DOCUMENTS

| | | |
|---|---|---|
| 67876 | 4/1973 | Australia . |
| 390244 | 4/1933 | United Kingdom . |
| 686819 | 1/1953 | United Kingdom . |
| 2073773A | 10/1981 | United Kingdom . |

OTHER PUBLICATIONS

Fundamental Aspects of Heat Treatment of Cast Al-Si-Mg Alloys By D. Apelian, S. Shivkumar and G. Sigworth.
Electric Infrared Process Heating: State of the Art Assessment, Mar. 1987; Battelle Memorial Institute, Final Report of Research Project 2478-1.
Alloys for Automobile Wheels, Updated on Apr. 1981; Aluminium Pechiney publication.

*Primary Examiner*—Melvyn J. Andrews
*Assistant Examiner*—Robert R. Koehler
*Attorney, Agent, or Firm*—MacMillan, Sobanski & Todd

[57] ABSTRACT

A method for producing a cast aluminum vehicle wheel uses a high intensity electric infrared heating system to heat treat the wheel. The infrared heating system is an indexing-type system which includes a plurality of individual heating stations. A first group of heating stations effects solution heat treating of the wheel, while a second group effects artificial aging. The infrared system enables the solution heat treating and aging to be completed in less than 15 minutes.

12 Claims, 6 Drawing Sheets

METHOD FOR PRODUCING A CAST ALUMINUM VEHICLE WHEEL

CROSS REFERENCE TO RELATED APPLICATION

This application is a continuation of U.S. patent application Ser. No. 07/842,942, filed Feb. 27, 1992, now abandoned.

BACKGROUND OF THE INVENTION

This invention relates in general to the manufacture of cast aluminum products and, in particular, to an improved method for producing a cast aluminum vehicle wheel.

In producing cast aluminum alloy products, such as vehicle wheels, it is generally necessary, after the initial casting operation, to subject the casting to a series of metal treatment steps in order to produce a casting having the desired tensile strength, yield strength, elongation, and fatigue strength properties. These steps include: (1) a "solution heat treatment" (SHT) process and (2) an "aging" (i.e., precipitation hardening) process. In the SHT process, an aluminum alloy casting is first heated to a "solution" temperature of about 1000° F. for a predetermined time such that certain soluble constituents contained in the alloy (such as age hardening constituent magnesium silicide $Mg_2Si$) are dissolved into "solid solution". The casting is then immediately and rapidly cooled (such as by quenching in a water bath) to retain the constituents in solid solution. This prevents rapid precipitation of the associated constituents which would otherwise occur if the casting were allowed to slowly cool through a certain temperature range. Next, during the "aging" process, the hardening constituents are precipitated out of the solution in a controlled manner to produce a casting having the desired mechanical properties. The aging is effected either "naturally" at room temperature over a period of at least 10–12 hours, or it can be "accelerated" by heating the casting to an elevated temperature for a shorter period of time (e.g. 450° F. for 30 minutes).

The conventional method of producing gravity-cast aluminum wheels includes initially pouring a suitable molten aluminum alloy, such as A356 aluminum, into a mold through its gate channel until the molten alloy flows upwardly through one or more mold risers. After the molten alloy has completely solidified, the casting is removed from the mold, at which time it can be degated (i.e., the portion of the casting which solidified in the gate channel is cut off) and quenched in water to cool the casting to room temperature. The casting is then derisered (i.e., the riser portions of the casting are removed) and subjected to fluoroscope inspection to locate any obvious casting defects.

Next, a group of wheels (typically between about 70 and 350), are loaded onto racks and subjected to a "batch" solution heat treatment process. The batch solution heat treatment process is effected by placing the racks in a large gas-fired or electrical-resistance forced air convection oven. In the convection oven, the castings are heated to a desired "solution" temperature (approximately 1000° F.) and are maintained at this temperature for approximately 2 to 8 hours. Following heating, the batch of wheels are immediately quenched in water to rapidly cool the wheels. Following cooling, the wheels are machined and painted and/or clear coated, during which time they are naturally aged at room temperature.

One of the problems associated with the above method for producing cast aluminum wheels relates to the amount of "work-in-process" which occurs as a result of the long process times. It is known that if a casting is heated to the correct "solution" temperature, proper solution heat treatment will occur within about 5 minutes. However, since a large number of wheels are heated during the batch solution heat treatment process, it is difficult to maintain even and uniform temperatures in all the wheels. Thus, to ensure that all the wheels are properly heat treated, the time to solution heat treat the wheels is usually at least two hours.

On a conservative estimate, the above described series of metal treatment steps, beginning with the casting of the wheel and through both the solution heat treatment and aging processes, require at least 12 hours to produce the wheels and more realisticly, takes closer to about 24 hours. Thus, any defect in the wheels (which are typically located during machining) is not readily discoverable until a relatively large number of wheels are "in process". As a result, a large number of wheels can be produced before a casting defect is discovered. In addition, since the wheels are cooled to room temperature prior to being solution heat treated, additional energy (and time) is needed to reheat the! wheels up to the specific temperature necessary for solution heat treatment.

One alternate method for producing aluminum alloy castings, such as a piston, is disclosed in U.K. Patent No. 390,244. According to the method of this patent, an aluminum alloy material is cast in a mold and removed from the mold while the temperature is above 662° F. (350° C.). The casting is immediately placed in an oven maintained at a specific elevated temperature in the range of 788° to 968° F. (420° to 520° C.), and remains in the oven for a time period between 10 and 30 minutes. Following heating, the casting is quenched in water, and then either naturally or artificially aged.

Other methods for producing a cast article of aluminum alloy material are disclosed in U.S. Pat. Nos. 4,420,345 and 4,419,143, both issued to Ito et al. According to the methods in these patents, an aluminum-silicon-magnesium alloy or an aluminum-silicon-copper-magnesium alloy containing 0.03 to 1.0% by weight of antimony is cast into a mold. Then, after the casting has completely solidified but before the temperature has fallen below 842° F. (450° C.), the casting is placed in a heating furnace maintained at a specific elevated temperature in the range of 896° to 1022° F. (480° to 550° C.), for a time period of less than 2 hours. Following heating, the casting is quenched in water and then subjected to an artificial aging process at a specific elevated temperature for less than 12 hours.

The methods disclosed in all of the above patents reduce the time to solution heat treat the cast aluminum article by not allowing the casting to cool below a certain temperature before initiating solution heat treatment. However, they all still utilize forced air convection furnaces to solution heat treat and/or artificially age the castings. Some drawbacks of forced convection furnaces include lengthly heat-up time before reaching processing temperature, difficulty in obtaining uniform temperature distribution, and sometimes inconsistant product quality.

Recently, electric infrared (IR) heating systems have received increasing attention in certain industrial applications. In an infrared heating system, a product is heated by generating electromagnetic radiation waves at a specific frequency and intensity, and directing these waves at the product. The particular frequency (i.e., wavelength) and intensity are selected in accordance with the particular heating requirements of the product. While infrared heating systems are used in a variety of different industrial applications, they are primarily used to dry and/or cure products with layers or thin films on their surfaces.

SUMMARY OF THE INVENTION

This invention relates to an improved method for producing a cast aluminum vehicle wheel wherein, instead of using a forced convection furnace to heat treat the wheel, an infrared heating system is used to either solution heat treat or artificially age the wheel or both. After the initial casting operation, the wheel is maintained in the mold until its temperature has fallen sufficiently to prevent "center pull" deformation when the wheel is removed from the mold (to about 800° F.). Thereafter, the wheel is removed from the mold and preferably degated, and solution heat treatment of the wheel is preferably initiated before the wheel temperature has fallen to a point wherein significant precipitation of hardening constituents from the "solution" occurs. This temperature is preferably above about 700° F. (371° C.). Generally, the time between removal from the mold and the commencement of the solution heat treatment process is less than about 2 minutes.

A first infrared heating system is used to effect solution heat treatment of the wheel. The first infrared heating system rapidly heats the wheel to a temperature in the range of 980° to 1020° F. (526° to 549° C.) and maintains that temperature for a period of 2 to 10 minutes to dissolve the age hardening constituents. Preferably, the wheel is indexed through an infrared heating system having a series of separate heating stations for individually heating each wheel. Each infrared heating station includes means for monitoring the actual temperature of the wheel, and the heating of the wheel at each station is controlled in accordance with its monitored temperature. Also, for future reference, the heating temperatures and times for each wheel can be recorded.

Immediately after the heating operation, the wheel is quenched in water to ensure that substantially all the age hardening constituents are retained in "solid" solution. After this quenching operation, a second infrared heating system is used to effect accelerated artificial aging of the wheel. The second infrared heating system heats the wheel to a temperature in the range of 400° to 500° F. (204° to 260° C.) for a period of 2 to 10 minutes. Preferably, the second infrared heating system is integrated with the first infrared heating system and includes separate heating stations for individually heating each wheel immediately after the wheel has been quenched. Following aging, the wheel is derisered, machined, and coated.

This method improves the manufacturing efficiency normally associated with producing cast wheels and enables a finished wheel to be completed in approximately 30 to 60 minutes after the initial casting operation. Thus, the amount of "work-in-process" is substantially reduced.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
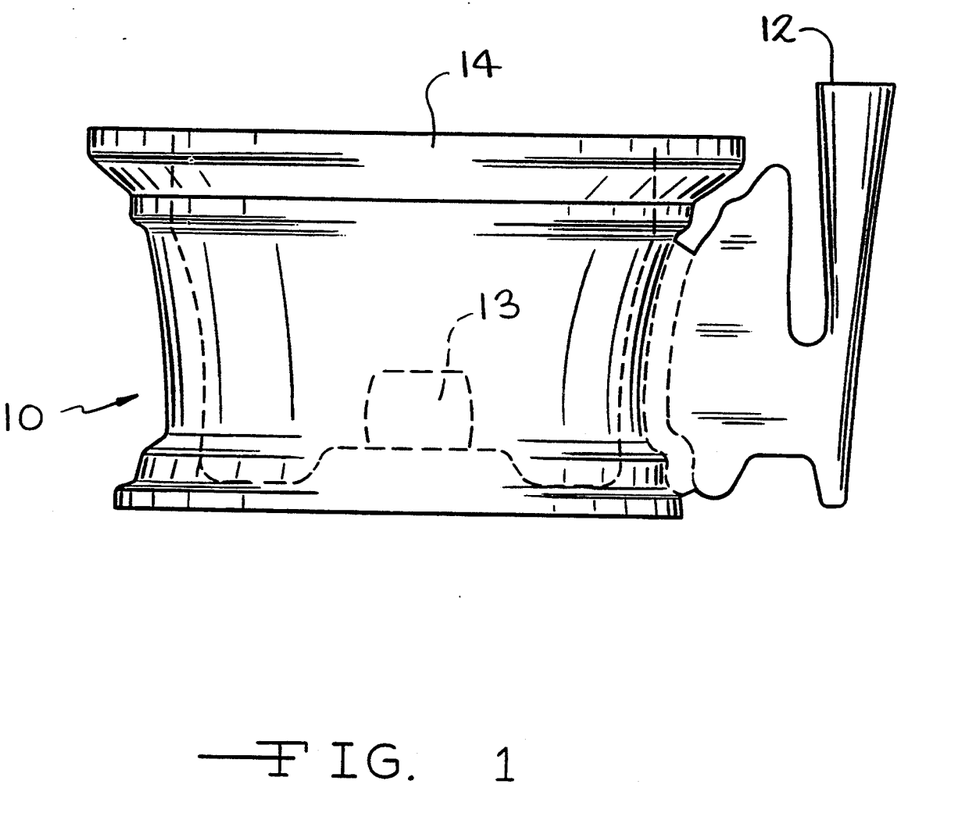
FIG. 1 is an elevational view of an aluminum alloy wheel casting (shown with its outboard side facing downwardly) which is produced in accordance with this invention.

Referring now to the drawings, there is illustrated in FIG. 1 an elevational view of a typical gravity cast aluminum alloy vehicle wheel, indicated generally at 10, which can be produced in accordance with the method of this invention. When gravity cast, molten aluminum is poured into the associated mold (not shown) through a channel to form a gate 12 and, as the molding cavity is filled, the molten aluminum flows upwardly into a center riser 13 and a rim (or side) riser 14. It will be appreciated that, while the invention is illustrated and described herein in conjunction with a wheel formed by the gravity casting method, the invention can be used with other casting methods such as, for example, low pressure, squeeze, pore free, semi-solid and die casting. With these other methods, the wheel would be cast without a gate 12 or risers 13 and 14.

Also, while the drawings and description herein show producing a cast "one piece" wheel 10, the invention can be practiced to form only a cast component of a multi-piece wheel such as, for example, a center spider portion (not shown), which is then secured to a separately formed rim (not shown) in a known manner to form the finished wheel. The cast component can also be the full front face of the wheel which is subsequently secured to a formed partial rim. As used in this description and the following claims, the term "wheel" includes not only a one piece cast wheel, but also a cast component of a multi-piece wheel.

The wheel 10 can be cast from a suitable aluminum casting alloy material such as, for example, A356 aluminum. This type of aluminum generally includes approximately, by weight, 6.0 to 7.5% silicon, 0.25 to 0.45% magnesium, about 0.20% iron, about 0.20% titanium, 0.008 to 0.04% strontium, and the balance aluminum. The term balance aluminum is intended to to include residual amounts of other elements which may be present in the alloy material, such as manganese, copper, calcium, antimony, zinc, barium, carbon, zirconium, and sodium. The strontium is used as a casting modifier to lower the required solution heating time. Other suitable casting alloys include A333 or A357 aluminum, or magnesium.

Figure 2:
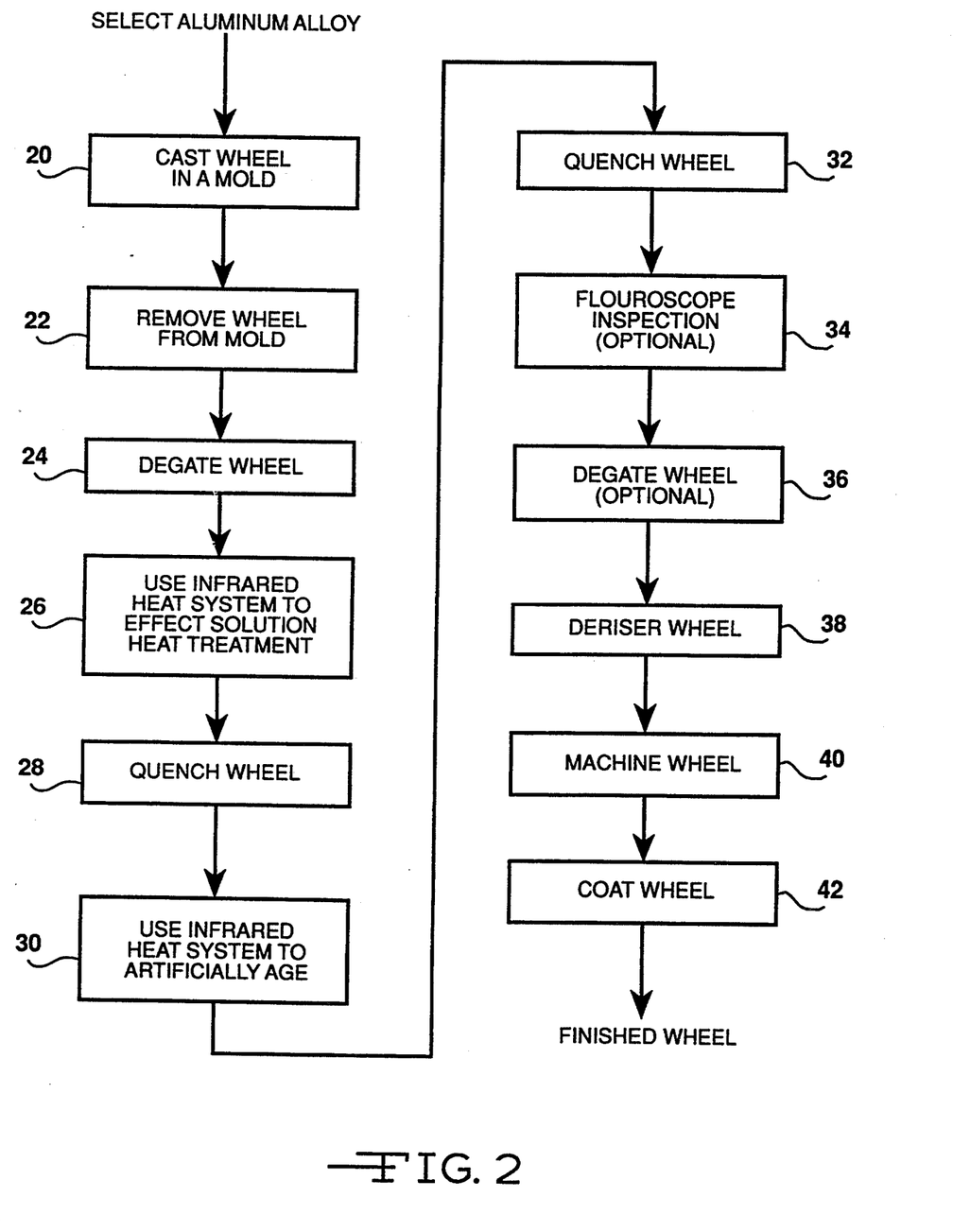
FIG. 2 is a block diagram showing the steps of the method of this invention.
Figure 3:
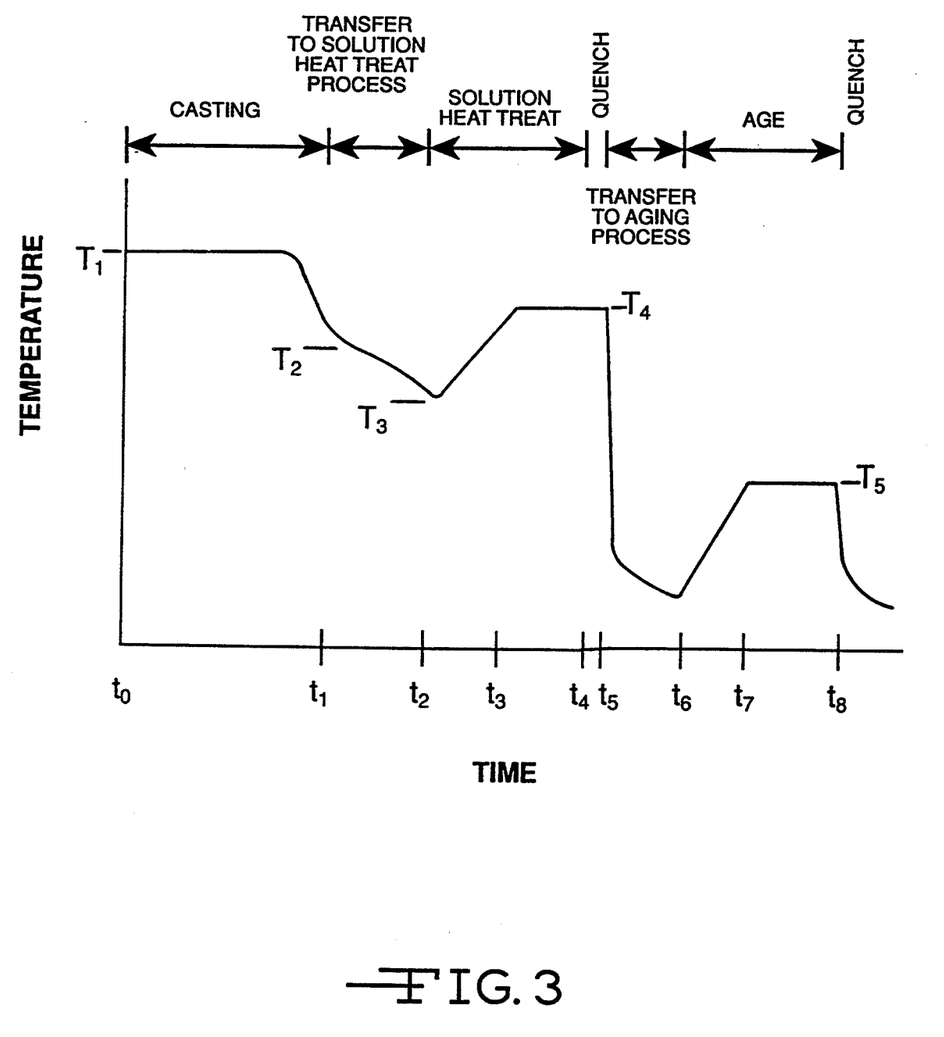
FIG. 3 is a graph illustrating the time-temperature parameters preferably followed by the method of this invention.

Turning now to FIGS. 2 and 3, the particular method of this invention will now be discussed. Initially, in step 20, molten aluminum alloy at a temperature $T_1$ (about 1300° F.) is poured into a gravity type mold (not shown) at time $t_0$ to form a casting having roughly the desired final shape of the wheel 10. The wheel 10 remains in the mold until its temperature has fallen sufficiently to prevent any "center pull" wheel deformation when the wheel 10 is removed from the mold (shown in FIG. 3 as temperature $T_2$ at time $t_1$), and is then immediately subjected to a solution heat treat process prior to its temperature falling to a point where significant precipitation of the hardening constituents has occurred (shown as temperature $T_3$ at time $t_2$). "Center pull" deformation occurs when the temperature of the wheel has not cooled sufficiently to allow the wheel to be pulled from the mold without deforming its shape. While the particular temperature may vary depending on the particular construction of the casting, it has been found that, in most instances, the temperature $T_2$ of a typical wheel 10 formed from A356 aluminum must fall below about 800° F. to prevent "center pull" deformation. In step 22, when the wheel 10 is removed from the mold, the gate 12 and the risers 13 and 14, shown in FIG. 1, remain as part of the casting.

After the wheel 10 has been removed from the mold, it is preferable to degate the wheel 10, in step 24, and then initiate an SHT process, in step 26, as soon as possible thereafter and prior to significant precipitation of the age hardening constituents (e.g., $Mg_2Si$) in the hot casting. However, as will be discussed below, the solution heat treatment of the wheel 10 can be initiated with the gate 12 remaining on the wheel 10, and the gate can be later removed. Depending upon the particular percentages of magnesium and silicon in the wheel 10, it is preferable that the temperature $T_3$ at time $t_2$ be no less than about 700° F. (371° C.) before SHT is initiated; however, in some instances, the temperature $T_3$ can fall to about 400° F. and still obtain satisfactory results. Normally, in order to maintain the desired temperature of the casting, the time between removal from the mold in step 22 (at time $t_1$) and the initiation of the SHT process in step 26 (at time $t_2$) is less than about 2 minutes.

In accordance with one feature of this invention, in step 26, an infrared heating system is used to effect individual solution heat treatment of the wheel 10. In step 26, the infrared heating system initially rapidly heats the wheel 10 up to a desired solution temperature $T_4$ within a time interval $t_2$ to $t_3$. Generally, the temperature $T_4$ is in the range of 980° to 1020° F. (527° to 549° C.), and the time interval $t_2$ to $t_3$ is approximately 1-4 minutes, depending on the initial temperature of wheel and the infrared heating rate. Once the wheel 10 reaches the desired temperature $T_4$, the infrared heating system maintains the wheel 10 at the temperature $T_4$ for a time interval $t_3$ to $t_4$, which is about 2-10 minutes. Preferably, for a wheel formed from A356 aluminum, the temperature $T_4$ is approximately 1000° F. (538° C.), the time $t_2$ to $t_3$ is about 1-2 minutes, and the time interval $t_3$ to $t_4$ is approximately 3-4 minutes. Thus, the total time interval $t_2$ to $t_4$ is about 5 minutes.

After completion of the solution heat treatment in step 26, the wheel 10 is immediately transferred to a water bath in step 28 at time $t_4$. Preferably, the time between completion of solution heat treatment in step 26 and commencement of quenching in step 28, is less than 10 seconds. In step 28, the wheel 10 is quenched in the water bath, and is then transferred to an accelerated artificial aging process in step 30, within a time interval $t_5$ to $t_6$. Preferably, the time interval $t_5$ to $t_6$ is around 45 seconds such that the total time interval $t_4$ to $t_6$, which represents the time between completion of solution heat treatment and commencement of artificially aging, is approximately 1 minute. The water bath is preferably maintained at a temperature in the range of 120° to 220° F. (48° to 104° C.).

In accordance with yet another feature of this invention, after the wheel 10 has been quenched in the water bath in step 28, an infrared heating system, in step 30, is used to effect the accelerated artificial aging process. Preferably, this occurs immediately after the quenching of step 28. In step 30, the infrared heating system initially heats the wheel 10 up to a desired aging temperature $T_5$ in a time interval $t_6$ to $t_7$, and then maintains the wheel 10 at the temperature $T_5$ for a time interval $t_7$ to $t_8$. The temperature $T_5$ is in the range of 400° to 500° F. (204° to 260° C.), the time interval $t_6$ to $t_7$ is approximately 1-4 minutes, and the time interval $t_7$ to $t_8$ is approximately 2-10 minutes. Preferably, the temperature $T_5$ is about 450° F., the time interval $t_6$ to $t_7$ is 1-2 minutes, and the time interval $t_7$ to $t_8$ is about 3-4 minutes, such that the total time interval $t_6$ to $t_8$ is around 5 minutes.

Immediately following the artificial aging process in step 30, the wheel 10, in step 32, is quenched in a water bath to cool the wheel for normal handling. After quenching, the wheel can be subjected to fluoroscope inspection, in step 34, to determine if the wheel 10 has any obvious casting defects. Following fluoroscope inspection, if the wheel 10 has not been degated in step 24 prior to being solution heat treated in step 26, the wheel 10 is degated in step 36 to remove the gate 12 from the casting. In step 38, the risers 13 and 14 are removed from the wheel 10. Following step 38, the wheel 10 is machined as necessary into its final desired shape. Finally, in step 42, the wheel 10 is clear coated (and/or painted if so desired), to produce the finished cast aluminum wheel.

In the preferred embodiment, the portion of the process beginning with the removal of the wheel 10 from the mold in step 22 at time $t_1$ and through the accelerated artificial aging of the wheel 10 and quenching in step 32 at time $t_8$, can be completed in less than 30 minutes and preferably, in less than 15 minutes. Since generally the time between step 30 and the machining in step 40 is less than about 30 minutes, a completed wheel, ready for coating, can be produced in less than 45 minutes. Thus, the use of infrared heating systems to effect both solution heat treat and artificial aging greatly reduced the process time as compared to the prior art methods. As a result, any defects in a wheel can be discovered before a large quantity of wheels have been produced. Further, the use of the infrared heating systems have been found to produce more uniform and consistent mechanical properties in the wheels.

Figure 4:
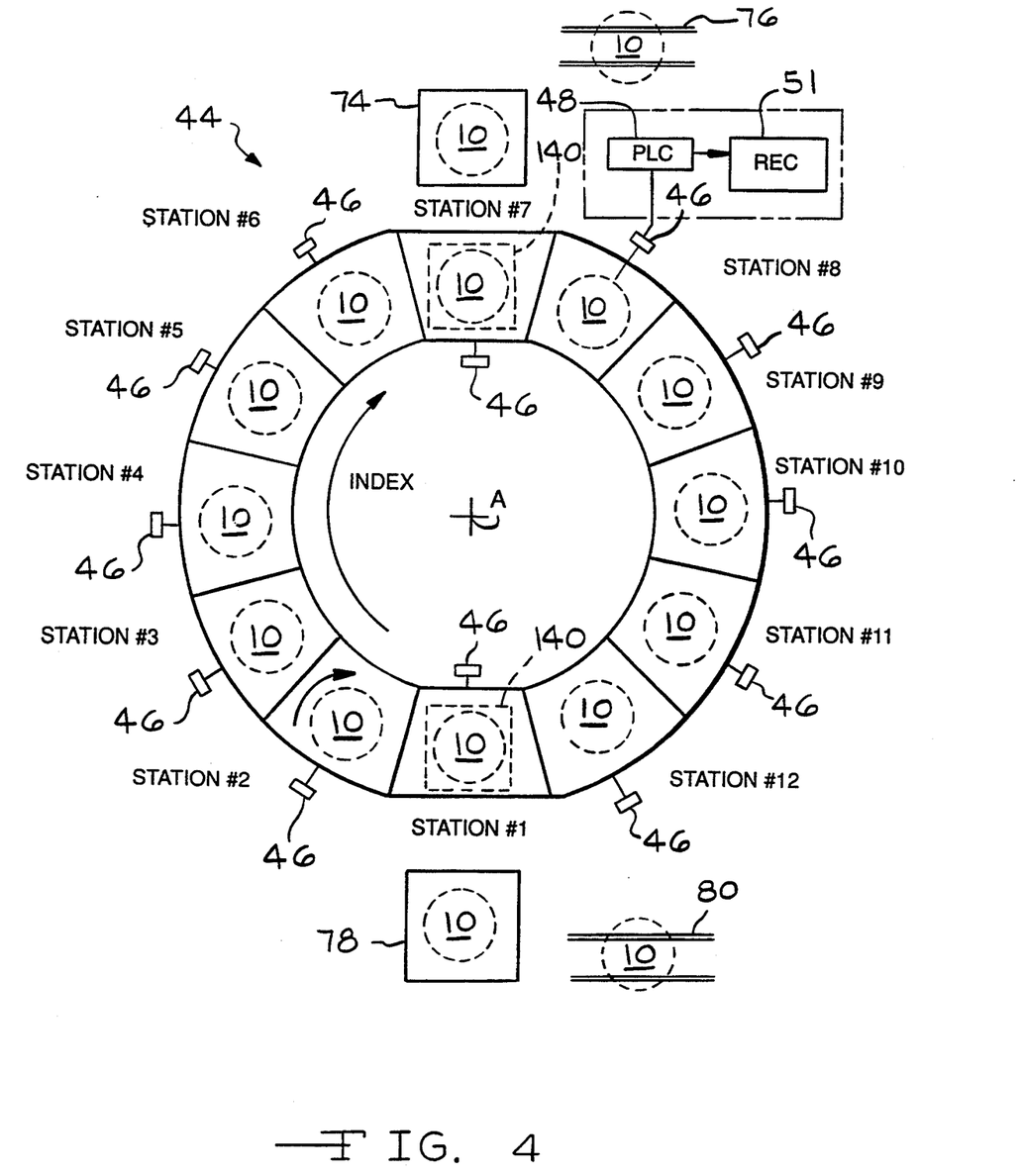
FIG. 4 is a top plan view of an infrared heating system used in producing a cast aluminum wheel according to the method of this invention.

Turning now to FIG. 4, there is shown an example of an integrated infrared heating system, indicated generally at 44, which can be used to both solution heat treat and artificially age the cast aluminum alloy wheel 10. As shown therein, the infrared heat system 44 is an indexing type carousel arrangement and includes stations #1 through #12 for processing the wheel 10. The system 44 includes an indexing unit (not shown) for individually advancing wheels through the system at a predetermined rate. As will be discussed, stations #2 through #6 are operative to effect solution heat treat of the wheel 10, while stations #8 through #12 are operative to effect accelerated artificial aging of the wheel 10.

Initially, an individual wheel 10 is loaded onto the indexing unit at station #1. The indexing unit rotates about an axis A and maintains a single wheel at each station for approximately 55-60 seconds, with an indexing time from one station to the next of less than three seconds. Accordingly, the total time required to index a wheel through the integrated infrared heating system 44 in order to both solution heat treat and artificially age the wheel, is less than 13 minutes.

Each of the stations #1 through #6 and #8 through #12 is provided with a separate means for sensing the actual temperature of the wheel at the respective station, such as temperature sensors 46. It has been found preferable to use one or more optical pyrometers at each station as the means for detecting the actual wheel temperature. Each temperature sensor 46 generates a signal representative of the temperature of the wheel 10 at the respective station. The temperature sensors are connected to a control unit (PLC) 48 which, as will be discussed, functions to separately control the heating of the wheel at each heating station. In FIG. 4, stations #2-#6 and #8-#12 are heating stations and are provided with high intensity heating ovens similar to that shown in FIG. 5.

Figure 5:
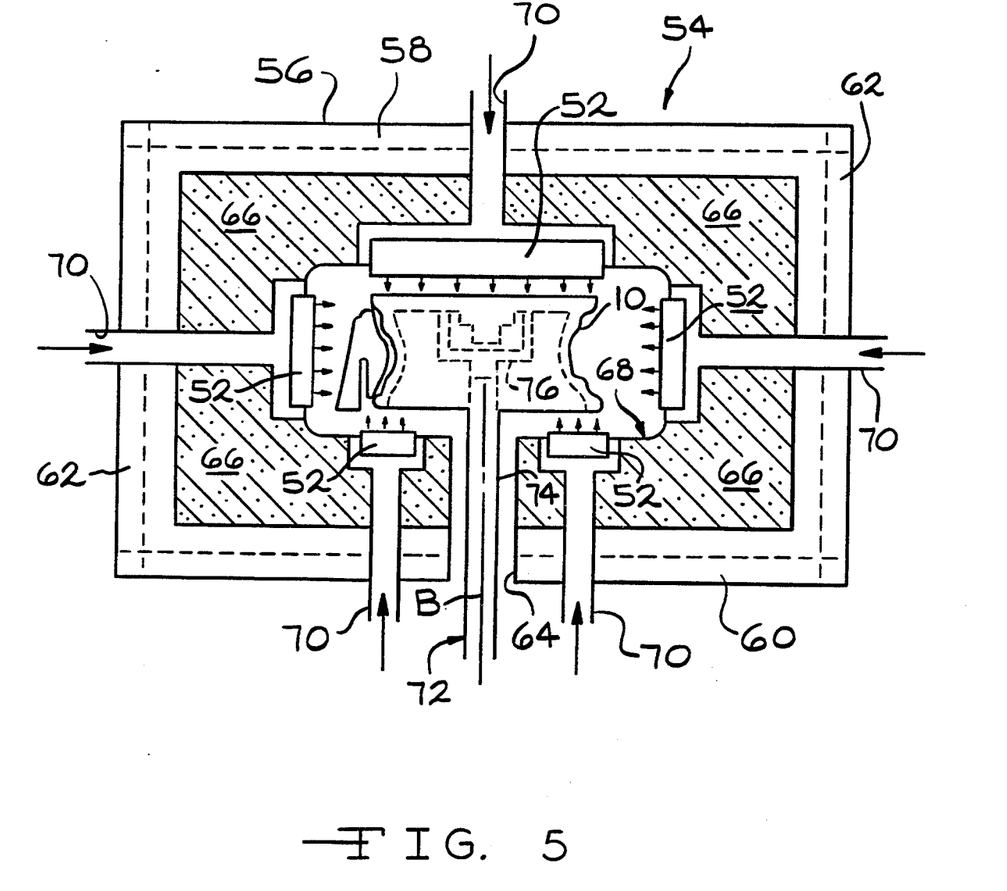
FIG. 5 is a partial cross sectional view taken along the line 5—5 of FIG. 4 and showing one of the individual infrared heating stations.

The control unit 48 is operative to control the heating at each individual station by generating controlled power signals on lines (not shown) to a plurality of infrared emitters 52 (shown in FIG. 5). The power signals are controlled in response to the monitored temperature of the respective wheel, and the desired heating phase of the process. In addition, the control unit 48 generates a signal to a recorder (REC) 51. The recorder 51 is operative to maintain an individual record of the heating temperatures and times of each wheel as the wheel is indexed through the system 44. Thus, if a wheel (which is later machined and coded with an identifying number) is found to be defective as a result of the heat treating process, the recorder 51 can be used to identify the specific time/temperature profile for that wheel and then identify any other wheels heated with similar profiles. As a result, the recorder 51 can quickly identify those wheels which were heated at the same temperatures as the defective wheel, and only the identified wheels need initially be checked for possible defects.

As previously mentioned, the solution heat treat process is commenced as quickly as possible after the casting operation, and preferably the wheel 10 is indexed to station #2 before its temperature has fallen below 700° F. At this point, a high intensity electric infrared heating oven 54, which is best shown in FIG. 5, is actuated to begin to heat the wheel 10 up to the temperature necessary to effect solution heat treatment. The high intensity electric infrared heating oven 54 includes a generally rectangular shaped enclosure 56 having an upper wall 58, a lower wall 60, and two side walls 62. The lower wall 60 is provided with an opening 64 formed therein.

The plurality of high intensity electric infrared emitters 52 are disposed within the enclosure 56 for generating infrared radiation in order to heat the wheel 10 in the desired manner. The emitters 52 are located near the upper wall 58, each of the side walls 62, and the lower wall 60 of the oven 54 on opposite sides of the opening 64. In the preferred embodiment, the high intensity electric infrared emitters 52 can be tungsten filament quartz lamps with 100 watt per inch power density. If necessary the emitters 52 can be grouped into a plurality of individual zones, and the heating of each zone can be separately controlled.

As shown in FIG. 5, the interior of the enclosure 56 is lined with insulation 66 to minimize the heat loss and increase the heating efficiency of each oven 54. A passageway 68 is provided in each enclosure 56 through which the wheel 10 is indexed. Also, appropriate ductwork 70 is provided in each enclosure 56 to supply cooling air to the emitters 52 to prevent them from overheating.

The indexing unit includes a plurality of spindle assemblies, one located at each station, and which are rotatable about an axis B and which extend upwardly through the opening 64 of the lower wall 60. The spindle assembly 72 includes a vertical shaft 74 having a bracket 76 releasably secured thereto for supporting the wheel 10. The bracket 76 is specially designed to support the particular wheel configuration. The spindle assembly 72 is coupled to a power rotating assembly (not shown) for rotating the wheel 10 (preferably at a speed of about 3-5 r.p.m.) about the axis B of the spindle assembly 72 wheel is being subject to infrared radiation at the respective heating station.

At station #2, the infrared emitters 52 begin to heat the wheel 10 at a rate of about 100° to 200° F. (43° to 93° C.) per minute. Normally, due to the initial temperature of the wheel when heating begins, and the indexing cycle of the system, the wheel will not reach the desired solution temperature at station #2. Thus, when the wheel 10 is indexed to station #3, it is heated at about the same rate until the temperature of the wheel 10 reaches the desired solution temperature in the range of 980° to 1020° F. (527° to 549° C.). Thereafter, the temperature of the wheel is maintained at the desired solution temperature (through stations #4-#6) until the end of the solution heat treat cycle.

Next, after the wheel 10 is indexed from station #6 to station #7, it is lifted from its associated spindle assembly 72, and is immediately quenched in a water tank 74. Immediately thereafter, the wheel 10 is returned to its spindle assembly 72 and is indexed to station #8 to begin an accelerated artificial aging process. Alternatively, the wheel 10 can be cooled to room temperature after is has been quenched at station #7 and then unloaded onto a conveyor 76 and then derisered, machined, painted, and naturally aged in the conventional manner.

At station #8, the control unit 48, in response to the monitored temperature of the wheel, generates power signals to the associated emitters to begin to heat the wheel at a predetermined rate (preferably at 100°-200° F. per minute) up to the desired aging temperature which, as previously mentioned, is preferably in the range of 400° to 500° F. (204° to 260° C). Normally, due to the initial temperature of the wheel when heating begins, and the indexing cycle of the system, the wheel will not reach the desired aging temperature at station #8. Thus, once the wheel 10 is indexed to station #9, it continues to be heated at about the same rate until the desired aging temperature is reached. Thereafter, the control 48 accurately maintains the wheel at the desired aging temperature through stations #10-#12 until the completion of the aging process.

Finally, the wheel 10 is indexed from station #12 to station #1 and where it is lifted from the station and is quenched in a water tank 78 to cool the wheel for further handling. The wheel 10 is then placed on a conveyor 80 which transfers the wheel to location wherein the the additional operations of steps 34-42 can be performed.

Figure 6:
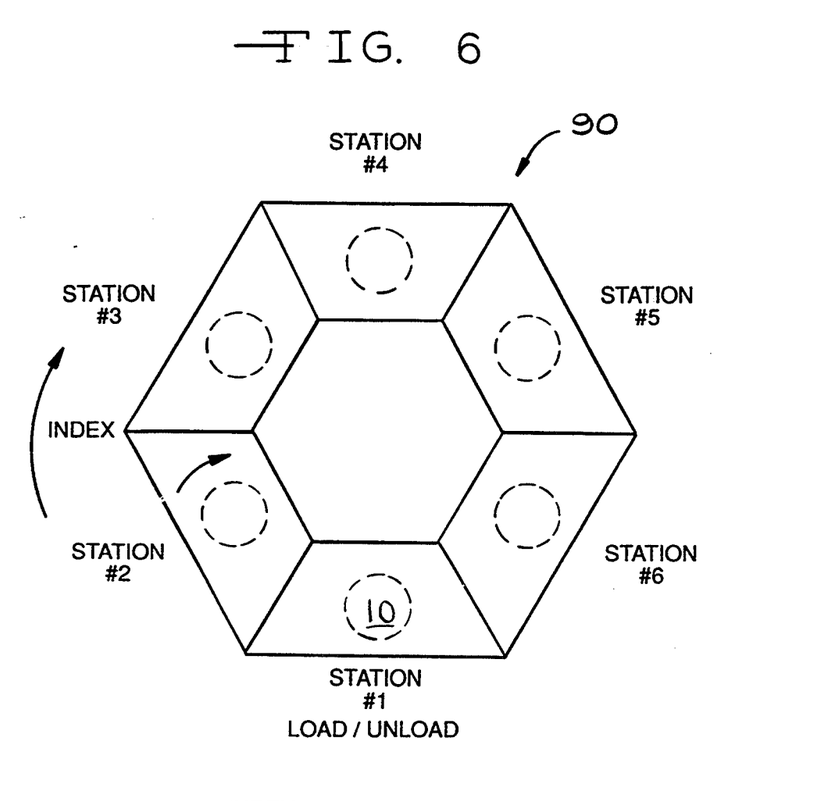
FIG. 6 is a schematic view of an alternate embodiment of an infrared heating system which can be used in producing a cast aluminum wheel according the invention.

FIG. 6 illustrates a schematic view of a further example of a high intensity electric infrared heating system 90 which is similar to the high intensity electric infrared heating system 44 shown in FIG. 4, except that it is not an integrated heating system. As shown therein, the wheel 10 can be loaded at station #1 and indexed through heating stations #2 through #6 to effect either a solution heat treatment process or an accelerated artificial aging process of the wheel 10.

Figure 7:
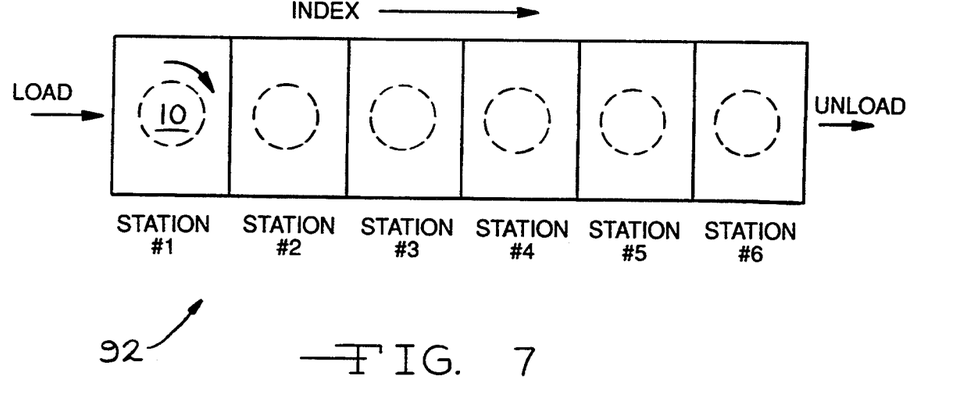
FIG. 7 is a schematic view of a further alternate embodiment of an infrared heating system.

FIG. 7 illustrates a schematic view of yet a further example of a high intensity electric infrared heating system 92 which is similar to the high intensity electric infrared heating system 44 shown in FIG. 5, except that it is not configured in a carousel arrangement. As shown therein, the wheel 10 can be loaded at station #1 and moved through heating stations #2 through #6, which are arranged in straightline type configuration, to effect either a solution heat treatment process or an accelerated artificial aging process of the wheel 10.

It should be noted that, while the preferred embodiments have been illustrated and described as using electric infrared heating, in some instances gas-fired infrared heating, or induction heating, could be used with similar satisfactory results.

The principle and mode of operation of this invention have been described and illustrated in its preferred embodiment. However, it must be understood that the invention may be practiced otherwise than as specifically explained and illustrated without departing from its spirit or scope.

What is claimed is:

1. A method for producing a cast aluminum vehicle wheel comprising the steps of:
   (a) casting a vehicle wheel in a mold from a selected aluminum alloy, the wheel defining an axis and having a wheel face formed perpendicular to the axis and an annular wheel rim formed concentric with the axis;
   (b) removing the wheel from the mold;
   (c) solution heat treating the wheel by directing infrared radiation from a first group of infrared emitters in a first direction toward the wheel face and by directing infrared radiation from a second group of infrared emitters in a second direction toward at least a circumferential portion of the wheel rim, the second direction being nonparallel to the first direction, both the first and second groups of infrared emitters being controlled to supply the infrared radiation at a level to rapidly heat the wheel and thereafter maintain the wheel temperature within a solution heat treatment temperature range for a solution heat treat time period corresponding to the selected aluminum alloy;
   (d) simultaneously with step (c), rotating the wheel relative to the emitters to evenly distribute the infrared radiation therethrough;
   (e) immediately following said solution heat treat time period, quenching the wheel; and
   (f) aging the wheel.

2. The method according to claim 1 wherein step f is performed by an infrared heating unit.

3. The method described in claim 1 including, during the solution heat process of step (c), sensing the temperature of the wheel and controlling the heating of the wheel in response to the sensed temperature of the wheel.

4. The method according to claim 3 including the step of using one or more optical pyrometers to sense the wheel temperature.

5. The method according to claim 3 including the step of sensing the wheel temperature prior to step (c), and thereafter controlling the heat energy supplied in step (c) in response to the temperature sensed prior to step (c).

6. The method according to claim 3 and further including the step of continuously sensing the wheel temperature during the entire solution heat treat time period.

7. The method according to claim 3 including the step of recording the specific time/temperature profile of the wheel during the solution heat treat process of step (c) through (e).

8. The method according to claim 1 wherein step (c) is performed by sequentially indexing the wheel through a plurality of heating stations, the wheel being retained at each station for a time period.

9. The method according to claim 1 wherein the solution heat treat time period is included in a range of from two to ten minutes.

10. The method according to claim 1 wherein step (b) completed, and step (c) is initiated, prior to the wheel temperature falling below 400° F.

11. The method described in claim 1 wherein step (f) is performed for an aging time period in a range of from two to ten minutes.

12. A method for producing a cast aluminum vehicle wheel comprising the steps of:
   (a) casting a vehicle wheel in a mold from a selected aluminum alloy, the wheel defining an axis and having a wheel face formed perpendicular to the axis and an annular wheel rim formed concentric with the axis;
   (b) removing the wheel from the mold;
   (c) solution heat treating the wheel;
   (d) aging the wheel by directing infrared radiation from a first group of infrared emitters in a first direction toward the wheel face and by directing infrared radiation from a second group of infrared emitters in a second direction toward at least a circumferential portion of the wheel rim, the second direction being nonparallel to the first direction, both the first and second groups of infrared emitters being controlled to supply the infrared radiation at a level to rapidly heat the wheel and thereafter maintain the wheel temperature within an aging temperature range for an aging time period corresponding to the selected aluminum alloy;
   (e) simultaneously with step (d), rotating the wheel relative to the emitters to evenly distribute the infrared radiation therethrough; and
   (f) immediately following said aging time period, quenching the wheel.

* * * * *